United States Patent [19]
Nelson et al.

[11] Patent Number: 5,822,485
[45] Date of Patent: Oct. 13, 1998

[54] OPTICAL CABLE CONTAINING PARALLEL FLEXIBLE STRENGTH MEMBERS AND METHOD

[75] Inventors: Derwin A. Nelson; William M. Watts, both of Hickory, N.C.

[73] Assignee: Siecor Corporation, Hickory, N.C.

[21] Appl. No.: 782,454

[22] Filed: Jan. 13, 1997

[51] Int. Cl.$^6$ ................................................ G02B 6/44
[52] U.S. Cl. ..................... 385/112; 385/109; 385/113; 385/114
[58] Field of Search ........................ 385/100–114

[56] References Cited

U.S. PATENT DOCUMENTS

| | | | |
|---|---|---|---|
| 4,659,174 | 4/1987 | Ditscheid et al. | 350/96.23 |
| 4,765,712 | 8/1988 | Bohannon et al. | 350/96.23 |
| 5,101,467 | 3/1992 | Bernard | 385/112 |
| 5,148,509 | 9/1992 | Kannabiran | 385/109 |

FOREIGN PATENT DOCUMENTS

| | | | |
|---|---|---|---|
| 0228132 | 12/1986 | European Pat. Off. | G02B 6/44 |
| 4121058 | 6/1991 | Germany | G02B 6/44 |

OTHER PUBLICATIONS

Siecor Product Information, CTB–106, Jan. 1995, "Single Fiber Cable".

Siecor Product Information, CC–18, 1986, "Heavy Duty Fan–Out Fiber Optic Cable" No Month.

Siecor Product Information, CTB–6A, Sep. 1994, "Flexible Plenum Single–Fiber Cable".

"Design of Miniature Optical Fiber Cord", Makoto Sato, Masao Tachikura and Nobuo Tomita, First Optoelectronics and Communications Conference (OECC '96) Technical Digest, Jul. 1996, pp. 278–279.

*Primary Examiner*—Phan T. H. Palmer

[57] ABSTRACT

An optical cable or optical cable element and a method of manufacturing the same. The cable or cable element includes a tubular jacket containing a single optical fiber and a layer of loose tensile strength fibers applied without an intended lay surrounding the optical fiber. The tension applied to the tensile strength fibers during manufacturing does not exceed the tension applied during manufacturing to the optical fiber.

12 Claims, 2 Drawing Sheets

OPTICAL CABLE CONTAINING PARALLEL FLEXIBLE STRENGTH MEMBERS AND METHOD

BACKGROUND OF THE INVENTION

This invention relates to an optical cable or an optical cable element which is part of an optical cable and a method for making the element or cable.

The term "optical fiber", as used herein, includes optical waveguides having one or more coatings thereon.

Cables employing single optical fibers surrounded by flexible tensile fibers or yarns are widely used in indoor applications, such as for interconnect purposes. The elements of such a cable include an optical fiber surrounded by a layer of stranded flexible dielectric strength members. The strength members may be aramid fibers, such as Kevlar®. An outer jacket is extruded over the layer of strength members.

If fire reaches a flammable cable located in a building, the cable can convey fire and smoke to other areas within the building. For this reason, indoor cables usually must either be located within a metal raceway or be resistant to the spreading of flame and the generation of smoke. Such metal raceways increase the cost of an installation and are somewhat difficult to install. Under the provisions of the United States' National Electrical Code (NEC), a cable which meets appropriate fire resistance standards provided by an authority such as Underwriters Laboratories (UL) may be allowed to be used in buildings without the use of a metal conduit. Cables used in buildings may be classified as plenum cables (OFNP), riser cables (OFNR), or general purpose cables (OFN). The plenum and riser ratings require the cable to meet separate standards for maximum acceptable flame propagation properties.

Therefore, cables employing single optical fibers surrounded by flexible tensile fibers or yarns typically include an outer jacket which is formed of flame-retardant material when the cables are rated OFNP or OFNR. A flame-retardant PVC material has been used as the outer jacket material. The flame resistance may be specified by UL Standard 1666 for riser-rated cables or by UL Standard 910 for plenum-rated cables.

The CSA is a Canadian authority similar to UL. The CSA ratings corresponding to OFNP and OFNR are FT-6 and FT-4, respectively.

These cables may employ either single-mode or multi-mode optical fibers. A typical storage temperature range is $-40°$ C. to $+70°$ C., and a typical operating temperature range is $-20°$ C. to $+70°$ C.

One example of a cable employing single optical fibers surrounded by flexible tensile fibers or yarns is Siecor Corporation's OFNR-rated heavy-duty single-mode single-fiber cable, which has an outside diameter of 2.9 mm and a weight of 8 kg/km. The cable has a rated short term maximum tensile load of 500N and a rated long term maximum tensile load of 240N. The cable has a short term minimum bend radius during installation of 5.0 cm and a rated long term minimum bend radius (unloaded) of 3.0 cm. The cable's crush resistance is 35N/cm, its impact resistance is 0.74 N-m, and its cyclic flex resistance is 300 cycles over sheaves 50 mm in diameter.

The above-described single-mode product meets Bellcore's specification GR 409-CORE-Issue 1. The corresponding multimode fiber product meets the specification ANSI/ICEA 5-83-596.

The plenum version of the Siecor single-fiber cable has an NEC rating of OFNP and a CSA rating of FT-6. Other cable specifications are similar to those listed above for the OFNR-rated cable. The outer jacket is formed of PVDF material. Flame-retardant PVC material also is used as the jacket material in plenum cables.

A plurality of subunits, each subunit consisting of a single optical fiber surrounded by flexible tensile fibers or yarns and covered by a tube, may be present in multi-fiber indoor cables. A cable employing two subunits may include no central strength member, while a cable employing four or more subunits may contain a central dielectric strength member capable of resisting longitudinal compression. A cable employing twelve subunits may employ two layers of subunits around the central strength member.

Such multi-fiber indoor cables may be used for voice, data, video, and imaging transmission in computer, process control, data entry, and wired office systems. Riser-rated cables may be used inside buildings in riser shafts, and plenum-rated cables may be used under computer room floors. An advantage of such a design is that the individual subunits may be individually routed for termination and maintenance. The multifiber cables may have a Bellcore GR409 rating or an ICEA S-83-596 rating.

In these prior art Siecor cables, the flexible aramid fiber tensile strength elements have been wrapped around the coated optical fibers at a helix angle of as small as about 0.3 degrees. In multi-fiber cables, the strength member elements referred to are included in each subunit. With larger helix angles, these wrapped strength fibers or yarns have created a continuous barrier between the coated optical fibers and the PVC material forming the outer jacket. With a helix angle of 0.3 degrees, the barrier sometimes has been observed to be ineffective, in that the optical fiber may stick to the jacket. The strength fibers or yarns have also been wrapped to help ensure cable flexibility, as a twisted construction often lowers the flexural modulus of the composite.

The fastest tensile yarn spinners currently available to make the cable have a rated speed of 300 RPM, thereby limiting the possible line speed. For instance, if the lay length of the strength yarns is 450 mm per revolution, the maximum translational line speed is 300 rev/min ×0.450 m/rev=135 m/min. These spinners have a minimum tension setting of 300 grams, with a processing variation of ±100%. This variation in tension causes variations in wrapping of the tensile strength elements, allowing gaps to form in the layer of tensile strength elements. Talc has been inserted in the cable to prevent the jacket material from sticking to the coated optical fibers during processing.

On the other hand, prior art cables also include constructions in which the flexible tensile strength elements are applied parallel to the optical fibers. One example is Kannabiran, U.S. Pat. No. 5,148,509, which discloses a cable including a central optical fiber, a layer of filling compound, a layer of aramid fibers which run parallel to the longitudinal axis of the cable, and an outer jacket. Although the tension in the optical fiber as it is paid out is disclosed to be about 70 grams, the tension on the aramid fibers is not disclosed. The layer of filling compound would keep the optical fiber mechanically decoupled from the aramid layer and the plastic jacket. Filling compound often is considered undesirable in an indoor cable.

Another such prior art cable is U.S. Pat. No. 4,659,174, which discloses an optical cable element in which an optical fiber or optical fiber bundle is surrounded by a layer of strength fibers, such as aramid fibers. An outer jacket surrounds the optical fibers and strength fibers. The strength fibers are parallel to each other and to the optical fibers. The strength fibers are provided at a slightly larger prestress during manufacturing, in order that the optical fiber has an overlength with respect to the strength fibers in the finished cable. Such an overlength can compromise the optical fiber attenuation performance at low temperatures.

Thus, a need exists for an improved optical fiber cable not including a filling compound layer, in which loose tensile strength yarns are disposed between and in contact with the coated optical fiber and the surrounding tube. The improved cable should allow greater processing speeds without sacrificing needed flexibility, and without causing undue sticking of the jacket material to the coated optical fibers during processing.

SUMMARY OF THE INVENTION

It is therefore an object of the present invention to manufacture a single-fiber optical cable using higher manufacturing line speeds to reduce unit costs.

Still another object of the invention is to avoid sticking of the cable jacket to the coated optical fiber contained in the jacket.

Yet another object of the invention is to avoid the need to employ solid lubricants in the cable.

Another object of the invention is to provide such cables having acceptable low temperature performance.

These and other objects are provided, according to the present invention, by a single-fiber optical fiber cable employing a tensile yarn layer in which the tensile yarn is applied at a tension which is not greater than the tension applied to the coated optical fiber. The tensile yarn is disposed without a lay about the coated optical fiber. Advantages of the improved cable include simplified manufacturing machinery, increased manufacturing line speeds, and the elimination of the need for a solid lubricant. The improved cable retains the advantage of avoidance of the jacket sticking to the coated optical fiber. The improved cable does not require an optical fiber overlength in order to pass certain industry test criteria.

The improved cable may be used as a separate cable, or it may be employed as a component of a multi-fiber optical cable.

Brief Description of the Drawings The preferred embodiments of the invention are described in the several drawings, in which.

Detailed Description of the Invention

The present invention will be described more fully hereinafter with reference to the accompanying drawings, in which one or more preferred embodiments of the invention are shown. This invention may, however, be embodied in many different forms and should not be construed as limited to the embodiments set forth herein; rather, these embodiments are provided so that the disclosure will fully convey the scope of the invention to those skilled in the art. Like numbers refer to like elements throughout. The drawings are not necessarily drawn to scale but are configured to clearly illustrate the invention.

Figure 1:
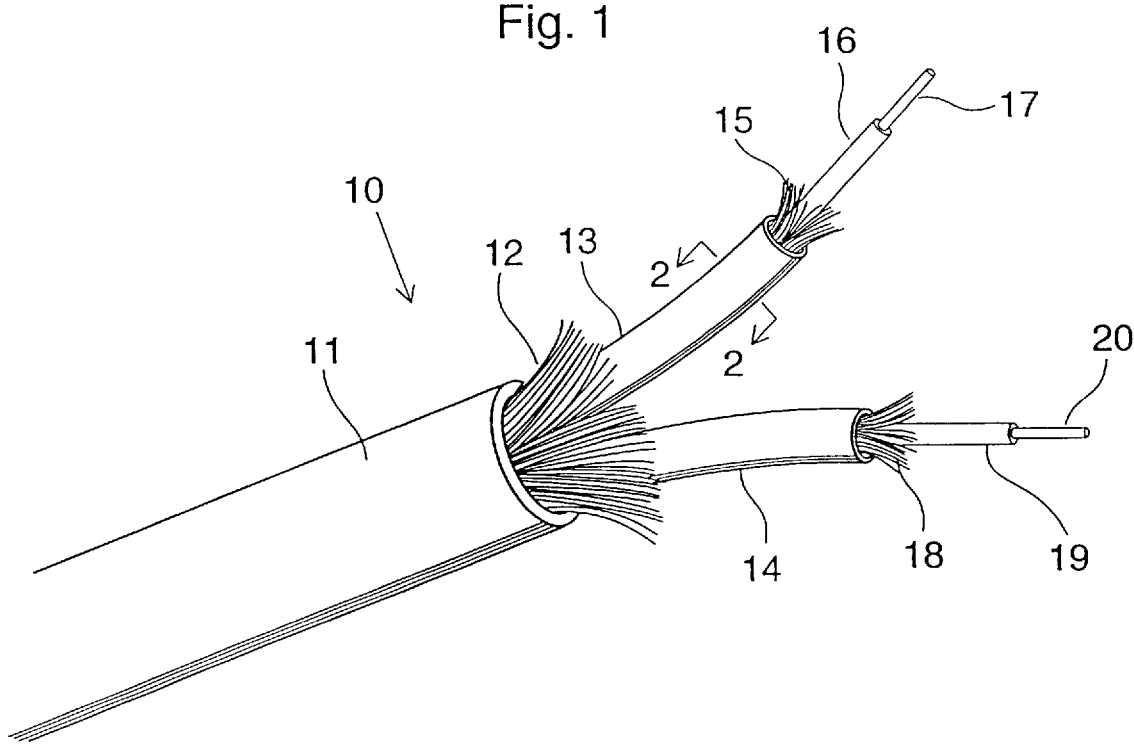
FIG. 1 is a perspective view of a cable including cable subunits according to the invention.

The dual optical fiber cable shown in FIG. 1 includes two subunits surrounded by a layer 12 of loose tensile filaments and an outer plastic cable jacket 11 formed of a flame resistant polyvinyl chloride (PVC) material. Loose tensile strength filaments 12 may be flexible aramid fibers such as Kevlar®. A first subunit comprises a glass optical fiber 17 having a plastic coating 16; a layer of loose tensile strength filaments 15 surrounding the coated optical fiber; and a subunit tubular plastic jacket 13 surrounding the strength filament layer and the coated optical fiber. A second subunit comprises a glass optical fiber 20 having plastic coating 19; a layer of loose tensile strength filaments 18 surrounding the coated optical fiber; and a plastic subunit jacket 14 containing the strength filament layer and the coated optical fiber.

Figure 2:
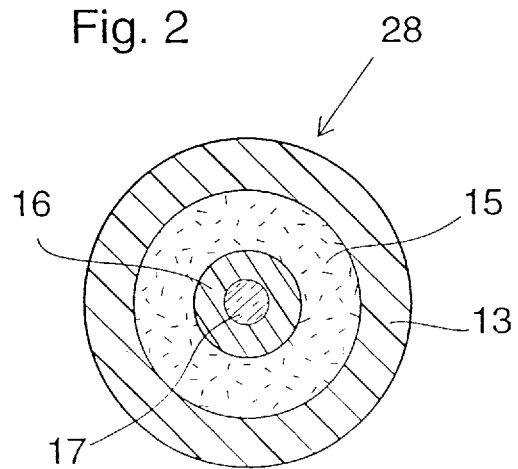
FIG. 2 is a cross-sectional view taken along lines 2—2 of FIG. 1 of a cable subunit; and, FIG. 3 is a schematic view of a manufacturing line for manufacturing a cable according to the invention.

A subunit 28 is shown in greater detail in FIG. 2. Glass optical fiber 17 comprises a core and a cladding and a first coating system which may have an outer diameter of 0.250 mm. The coated optical fiber 27 comprises the glass optical fiber 17 and its second coating layer 16 formed of PVC material, which may have an outer diameter of 0.900 mm. Surrounding layer 16 is a layer 15 of loose tensile strength filaments disposed in parallel with coated optical fiber 27. These tensile strength filaments may be formed of aramid fiber yarns such as Kevlar®. Surrounding layer 15 is a tubular plastic jacket 13 formed of polyvinyl chloride (PVC) material which may have an outer diameter of 2.0, 2.4, or 2.9 mm.

Figure 3:
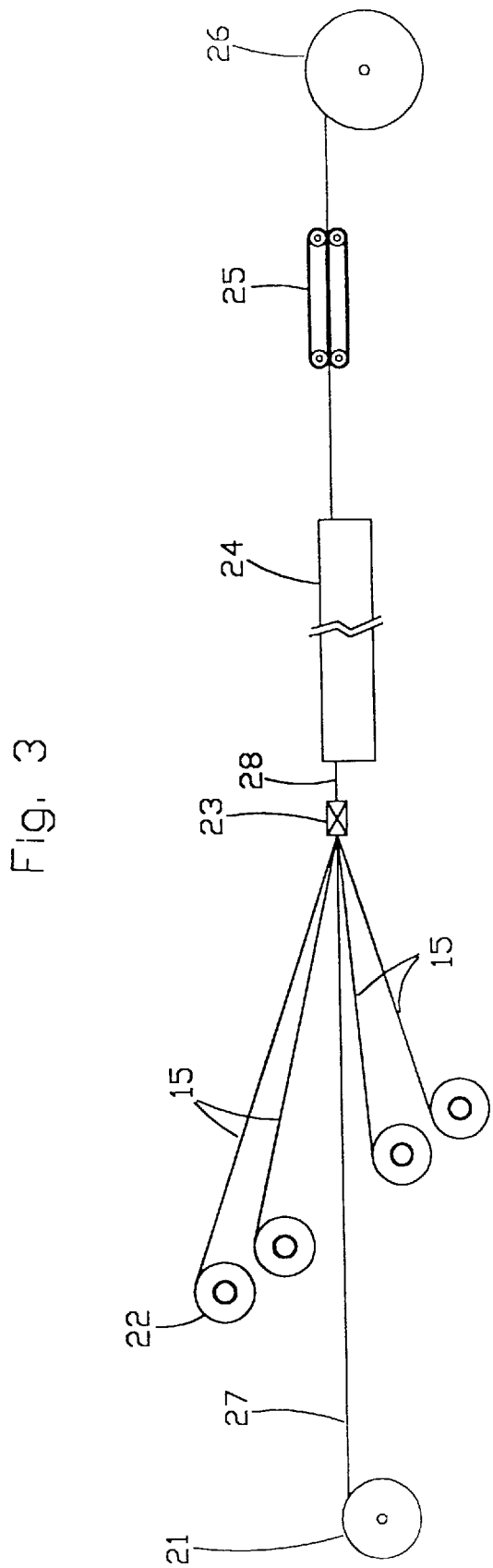

A method according to the invention of making the cable subunits is shown in FIG. 3. A coated optical fiber 27 is unwound from pay-off reel 21 under a first tension. Four reels 22 each dispense an aramid fiber yarn strength member 15 under a second tension. Yarns 15 and the coated optical fiber 27 are collected by a non-rotating lay plate at the rear entrance of extruder crosshead 23, with the coated optical fiber 27 passing through a central opening in the lay plate and the four yarns 15 being distributed by holes distributed at regular 90 degree intervals around the central opening through which the coated optical fiber passes. The tubular jacket 13 is then applied by extruder crosshead 23 to produce the completed single-fiber cable 28. The yarns 15 occupy the space between coating 16 and jacket 13 to make up a uniform layer of loose tensile strength fibers completely separating the coated optical fiber 27 and the jacket 13 so that they do not contact each other. Yarns 15 are applied so as to lie parallel with coated optical fiber 27 without any intended twist or stranding.

Water bath 24 then cools the tubular jacket 13. The cable 28 then passes through pulling device 25 and is wound onto take-up reel 26.

It is important to control the tensions applied to the coated optical fiber 27 and the aramid fiber yarns 15. Using the process described above, single-fiber cables were produced and the attenuation after cabling was compared to the attenuation before cabling. Tension applied to the coated optical fiber 27 and the aramid fiber yarns were varied. Attenuation change was measured during temperature cycling according to Bellcore GR-409-CORE, Issue 1 (Interconnect Rating). Results are reported in Table 1 below.

TABLE 1

Change in Optical fiber attenuation as a function of tension applied to the coated optical fibers and aramid yarn strands during cabling

| Aramid fiber tension (grams) | Optical fiber tension (grams) | Maximum attenuation change at 1550 nm (dB/km) |
|---|---|---|
| 100 | 200 | 0.00 |
| 100 | 300 | 0.00 |
| 200 | 200 | 0.00 |
| 200 | 300 | −0.01 |
| 500 | 300 | 12.59 |

The results show that the attenuation change was small whenever the tension applied to the coated optical fiber was greater than or equal to the tension applied to the Kevlar® yarns. However, the attenuation unacceptably increased by 12.50 dB/km when the tension applied to the Kevlar® yarns was 500 g and the tension applied to the coated optical fiber was 300 g.

It is believed that if the tension applied to the aramid fiber filament yarns is higher than the tension applied to the coated optical fiber 27, the coated optical fiber is pushed to the inner surface of tubular jacket 13. Coating 16 may stick to jacket 13 if contact occurs. If the coated optical fiber 27 is unable to move freely within the jacket 13, during temperature cycling the jacket 13 will axially expand and contract, placing excessive stress on the coated optical fiber 17. Therefore, the tension applied to the coated optical fiber should be greater than or equal to the tension applied to the tensile strength yarns.

Cables 28 according to the invention may be made without the use of a lubricant such as talc and without sticking of the coated optical fiber 27 to the PVC jacket 13. Cables 28 have passed all mechanical tests as specified by Bellcore GR-409 or ICEA 5-83-596. Cables 28 according to the invention including either multimode or single-mode optical fibers have been successfully manufactured.

In the preferred embodiment, the coated optical fiber does not have a substantially greater length than the surrounding tensile strength members. Thus, the optical fiber is not provided with an overlength designed to provide relief from strain when tension is applied to the cable or cable element. Such an overlength would help to cause the coated optical fiber to assume a wavelike shape, which in turn would cause the coated optical fiber to penetrate the layer of flexible strength members, thereby disrupting the uniformity of that cushioning layer. Parenthetically, the length of the single-fiber cable or cable element is taken to be, for practical purposes, the same as the length of the tensile strength members because, under even low tensions, the length of the cable or cable element is controlled by the strength members bearing the tensile load.

It is to be understood that the invention is not limited to the exact details of the construction, operation, exact materials, or embodiments shown and described, as modifications and equivalents will be apparent to one skilled in the art without departing from the scope of the invention.

What is claimed is:

1. A fiber optic cable, comprising: an outer cable jacket; at least one optical fiber subunit disposed in said cable outer jacket, said optical fiber subunit including a subunit jacket surrounded by a first layer of strength filaments; and an optical fiber disposed in said subunit jacket, said optical fiber comprising a tension therein, said optical fiber surrounded by a second layer of strength filaments having tension therein, said strength filaments of said second layer are generally parallel to said optical fiber, the tension in said optical fiber being greater than or equal to the tension in said second layer of strength filaments.

2. A fiber optic cable, comprising:

an outer cable jacket;

at least one optical fiber subunit disposed in said cable outer jacket, said optical fiber subunit including a subunit jacket surrounded by a first layer of strength filaments; and an optical fiber disposed in said subunit jacket, said optical fiber comprising a tension therein, said optical fiber surrounded by a second layer of strength filaments having tension therein, the tension in said optical fiber being greater than or about equal to the tension in said second layer of strength filaments.

3. The fiber optic cable of claim 2, wherein said strength filaments of said second layer are generally parallel to said optical fiber.

4. The fiber optic cable of claim 2, wherein said second layer of strength filaments comprises loose tensile strength filaments.

5. The fiber optic cable of claim 2, wherein said strength filaments comprise aramid yarns.

6. A method for making an optical fiber cable or cable subunit comprising a single optical fiber having a coating thereon, a tubular jacket, and a layer of loose tensile strength yarns disposed between and in contact with said jacket and said coating, comprising paying off under a first tension a coated single optical fiber having a coating thereon, paying off under a second tension a plurality of bundles of tensile strength yarns, laying said tensile strength yarn bundles without a lay about the lateral surface of said coated optical fiber, thereby forming a layer of tensile strength yarns about said coated optical fiber to provide complete separation between said coated optical fiber and said jacket; and extruding a jacket about said tensile strength yarn layer, characterized in that said second tension does not exceed said first tension.

7. A method of making a single-mode optical fiber cable or cable subunit as set out in claim 6.

8. A method of making a multimode optical fiber cable or cable subunit as set out in claim 6.

9. In a method for making an optical fiber cable or cable subunit comprising the steps of:

paying off an optical fiber having a first tension;

paying off tensile strength yarns having a second tension, said second tension does not exceed said first tension;

forming a layer of said tensile strength yarns about said optical fiber by longitudinally placing said tensile strength yarns adjacent said optical fiber; and extruding a jacket about said tensile strength yarns.

10. In the method of claim 9, wherein said optical fiber is a single-mode optical fiber.

11. In the method of claim 9, wherein said optical fiber is a multi-mode optical fiber.

12. In the method of claim 9, wherein said tensile strength yarns are placed generally parallel to said optical fiber.

\* \* \* \* \*